(12) United States Patent
Inoue et al.

(10) Patent No.: US 12,155,422 B2
(45) Date of Patent: Nov. 26, 2024

(54) WIRELESS COMMUNICATION QUALITY VISUALIZATION SYSTEM, WIRELESS COMMUNICATION QUALITY VISUALIZATION DEVICE, AND MEASUREMENT APPARATUS

(71) Applicant: NEC Corporation, Tokyo (JP)

(72) Inventors: Takamichi Inoue, Tokyo (JP); Shinichi Anami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 502 days.

(21) Appl. No.: 17/422,671

(22) PCT Filed: Jan. 16, 2020

(86) PCT No.: PCT/JP2020/001245
§ 371 (c)(1),
(2) Date: Jul. 13, 2021

(87) PCT Pub. No.: WO2020/153221
PCT Pub. Date: Jul. 30, 2020

(65) Prior Publication Data
US 2022/0123848 A1    Apr. 21, 2022

(30) Foreign Application Priority Data
Jan. 21, 2019   (JP) ................................ 2019-007786

(51) Int. Cl.
*H04B 17/391*   (2015.01)
*H04B 17/23*    (2015.01)
(Continued)

(52) U.S. Cl.
CPC .......... *H04B 17/391* (2015.01); *H04B 17/23* (2015.01); *H04W 24/08* (2013.01); *H04W 84/12* (2013.01)

(58) Field of Classification Search
None
See application file for complete search history.

(56) References Cited

U.S. PATENT DOCUMENTS 6,597,380 B1 *   7/2003   Wang ..................... G06T 15/20
                                                      715/848
7,246,045 B1 *   7/2007   Rappaport .............. H04L 41/22
                                                      703/2
(Continued)

FOREIGN PATENT DOCUMENTS

CN         101315632 A   * 12/2008
CN         101799835 B   *  7/2012
(Continued)

OTHER PUBLICATIONS

JP2014179719, (WIPO Translation)—Radio Communication Device, Method for Determining Priority Order of Use Access Point, Program and Recording Medium (Year: 2014).*

(Continued)

*Primary Examiner* — Berhanu Tadese

(57) ABSTRACT

The wireless communication quality visualization device 10 includes condition setting means 11 which sets measurement condition that can identify a target whose communication quality is measured, and extraction condition that can identify data to be displayed in data on communication quality collected according to the measurement condition, and display data generation means 12 which generates display data for displaying spatial and temporal communication quality based on the data extracted according to the extraction condition.

8 Claims, 7 Drawing Sheets

(51) Int. Cl.
*H04W 24/08* (2009.01)
*H04W 84/12* (2009.01)

(56) References Cited

U.S. PATENT DOCUMENTS

| | | | | |
|---|---|---|---|---|
| 7,286,971 | B2* | 10/2007 | Rappaport | H04L 41/22 703/2 |
| 7,801,489 | B2* | 9/2010 | Keller | H04B 17/345 455/67.11 |
| 8,234,274 | B2* | 7/2012 | Guo | G06F 16/94 707/726 |
| 8,538,463 | B2* | 9/2013 | Lee | H04W 24/08 455/457 |
| 8,839,288 | B2* | 9/2014 | Morris | H04N 21/41265 725/20 |
| 8,995,347 | B2* | 3/2015 | Nam | H04W 48/12 370/252 |
| 9,040,095 | B2* | 5/2015 | Nizam | H04W 4/025 424/724 |
| 9,143,413 | B1* | 9/2015 | Manku | H04M 15/846 |
| 9,307,521 | B2* | 4/2016 | Ng | H04L 5/0053 |
| 9,319,910 | B2* | 4/2016 | Shomura | H04W 24/08 |
| 9,867,120 | B2* | 1/2018 | Ng | H04W 48/16 |
| 9,900,627 | B2* | 2/2018 | Cassanova | H04N 21/23418 |
| 10,085,202 | B2* | 9/2018 | Ng | H04L 25/0224 |
| 10,306,399 | B2* | 5/2019 | Khan | H04B 17/309 |
| 10,411,813 | B2* | 9/2019 | Pauly | H04B 17/29 |
| 10,708,852 | B2* | 7/2020 | Ng | H04L 25/0202 |
| 10,750,434 | B2* | 8/2020 | Ng | H04L 25/0202 |
| 10,756,830 | B2* | 8/2020 | Tiwari | H04L 67/566 |
| 11,038,557 | B2* | 6/2021 | Nam | H04L 5/0035 |
| 11,509,355 | B2* | 11/2022 | Nam | H04B 7/024 |
| 11,581,959 | B2* | 2/2023 | Li | H04B 17/26 |
| 11,638,281 | B2* | 4/2023 | Mo | H04B 7/0691 370/329 |
| 11,659,023 | B2* | 5/2023 | Shelton, IV | A61B 34/25 709/227 |
| 2005/0043933 | A1* | 2/2005 | Rappaport | H04L 41/5032 703/1 |
| 2006/0020178 | A1* | 1/2006 | Sotos | A61B 5/374 600/300 |
| 2008/0036900 | A1* | 2/2008 | Nakajima | G03B 17/18 348/345 |
| 2008/0274702 | A1* | 11/2008 | Keller | G01R 29/0871 455/67.13 |
| 2009/0228318 | A1* | 9/2009 | Ara | G06Q 10/06398 705/7.42 |
| 2010/0271966 | A1* | 10/2010 | Hirano | H04W 24/10 370/252 |
| 2012/0135748 | A1* | 5/2012 | Lee | H04W 4/029 455/456.1 |
| 2014/0064136 | A1* | 3/2014 | Shomura | H04W 24/08 370/253 |
| 2014/0133395 | A1* | 5/2014 | Nam | H04B 7/0452 370/328 |
| 2015/0224127 | A1* | 8/2015 | Nizam | A61P 1/10 600/156 |
| 2017/0007639 | A1* | 1/2017 | Nizam | A61P 1/00 |
| 2017/0222734 | A1* | 8/2017 | Pauly | H01Q 21/24 |
| 2017/0288743 | A1* | 10/2017 | Nam | H04L 5/006 |
| 2018/0102858 | A1* | 4/2018 | Tiwari | H04L 67/566 |
| 2018/0288561 | A1* | 10/2018 | Khan | H04W 4/02 |
| 2020/0412465 | A1* | 12/2020 | Hamabe | H04B 17/3912 |
| 2021/0297115 | A1* | 9/2021 | Nam | H04L 5/0053 |
| 2022/0038146 | A1* | 2/2022 | Mo | H04W 24/10 |
| 2022/0123848 | A1* | 4/2022 | Inoue | H04W 16/18 |
| 2023/0087900 | A1* | 3/2023 | Nam | H04L 5/0035 375/267 |
| 2023/0217262 | A1* | 7/2023 | Inoue | H04W 4/38 370/329 |

FOREIGN PATENT DOCUMENTS

| | | | | |
|---|---|---|---|---|
| CN | 102663557 | A * | 9/2012 | |
| CN | 103473306 | A * | 12/2013 | |
| CN | 102564964 | B * | 7/2014 | |
| CN | 103901173 | A * | 7/2014 | |
| CN | 104316957 | A * | 1/2015 | |
| CN | 102663557 | B * | 12/2015 | |
| CN | 105426461 | A * | 3/2016 | G06F 16/29 |
| CN | 205207140 | U  | 5/2016 | |
| CN | 104316957 | B * | 2/2017 | |
| CN | 107340858 | A * | 11/2017 | G06F 3/013 |
| CN | 107749081 | A * | 3/2018 | G06T 17/20 |
| CN | 108491994 | A * | 9/2018 | |
| CN | 105426461 | B * | 11/2018 | G06F 16/29 |
| CN | 108921946 | A * | 11/2018 | G06K 17/0022 |
| CN | 109065162 | A * | 12/2018 | G16H 10/20 |
| CN | 105718881 | B * | 1/2019 | G06K 9/00771 |
| CN | 110058298 | A * | 7/2019 | G01V 1/282 |
| CN | 110109768 | A * | 8/2019 | G06F 11/0751 |
| CN | 107749081 | B * | 5/2021 | G06T 17/20 |
| CN | 109477159 | B * | 8/2021 | C01B 32/30 |
| CN | 108595610 | B * | 12/2021 | |
| CN | 114071232 | A * | 2/2022 | |
| EP | 3240231 | A1 * | 11/2017 | H04L 41/00 |
| EP | 3240231 | B1 * | 12/2020 | H04L 41/00 |
| JP | 2000322439 | A * | 11/2000 | |
| JP | 3154992 | B2 * | 4/2001 | |
| JP | 2001143090 | A * | 5/2001 | |
| JP | 2004348555 | A * | 12/2004 | |
| JP | 2005085166 | A * | 3/2005 | G06F 17/30958 |
| JP | 3881238 | B2 * | 2/2007 | G06F 19/22 |
| JP | 2007109183 | A * | 4/2007 | |
| JP | 2007156660 | A * | 6/2007 | G06K 7/0008 |
| JP | 2009211574 | A * | 9/2009 | G06Q 10/06 |
| JP | 2010128870 | A * | 6/2010 | |
| JP | 2010250769 | A * | 11/2010 | |
| JP | 2010257118 | A * | 11/2010 | |
| JP | 4818681 | B2 * | 11/2011 | |
| JP | 2012114895 | A * | 6/2012 | H04W 24/08 |
| JP | 5370744 | B2 * | 12/2013 | |
| JP | 2014-049833 | A  | 3/2014 | |
| JP | 2014153721 | A * | 8/2014 | |
| JP | 2014-179719 | A  | 9/2014 | |
| JP | 2015135589 | A * | 7/2015 | |
| JP | 2016207059 | A * | 12/2016 | G06Q 30/02 |
| JP | 2017-169003 | A  | 9/2017 | |
| JP | 2017-534192 | A  | 11/2017 | |
| JP | 6421199 | B2 * | 11/2018 | H04L 41/00 |
| JP | 6464024 | B2 * | 2/2019 | G06Q 30/02 |
| JP | 6555275 | B2 * | 8/2019 | G06F 16/00 |
| JP | 2020126499 | A * | 8/2020 | |
| JP | 7140267 | B2 * | 9/2022 | H04B 17/23 |
| JP | 7251557 | B2 * | 4/2023 | H04B 17/23 |
| KR | 1653353 | B1 * | 9/2016 | G06F 9/44 |
| TW | 202024866 | A * | 7/2020 | G06F 3/013 |
| WO | WO-2007063758 | A1 * | 6/2007 | G06K 7/0008 |
| WO | 2009/072286 | A1  | 6/2009 | |
| WO | WO-2016079909 | A1 * | 5/2016 | G06F 16/00 |
| WO | WO-2016103421 | A1 * | 6/2016 | H04L 41/00 |
| WO | WO-2016174878 | A1 * | 11/2016 | G06Q 30/02 |
| WO | WO-2020153221 | A1 * | 7/2020 | H04B 17/23 |
| WO | WO-2020183967 | A1 * | 9/2020 | H04B 17/23 |
| WO | WO-2021117230 | A1 * | 6/2021 | H04L 5/0048 |
| WO | WO-2022004567 | A1 * | 1/2022 | |
| WO | WO-2022240689 | A1 * | 11/2022 | E21B 41/00 |
| WO | WO-2023037398 | A1 * | 3/2023 | |
| WO | WO-2023037399 | A1 * | 3/2023 | |

OTHER PUBLICATIONS

JP2014179719, Japanese Language Publication (Year: 2014).*
International Search Report for PCT Application No. PCT/JP2020/001245, mailed on Mar. 24, 2020.
English translation of Written opinion for PCT Application No. PCT/JP2020/001245, mailed on Mar. 24, 2020.

* cited by examiner

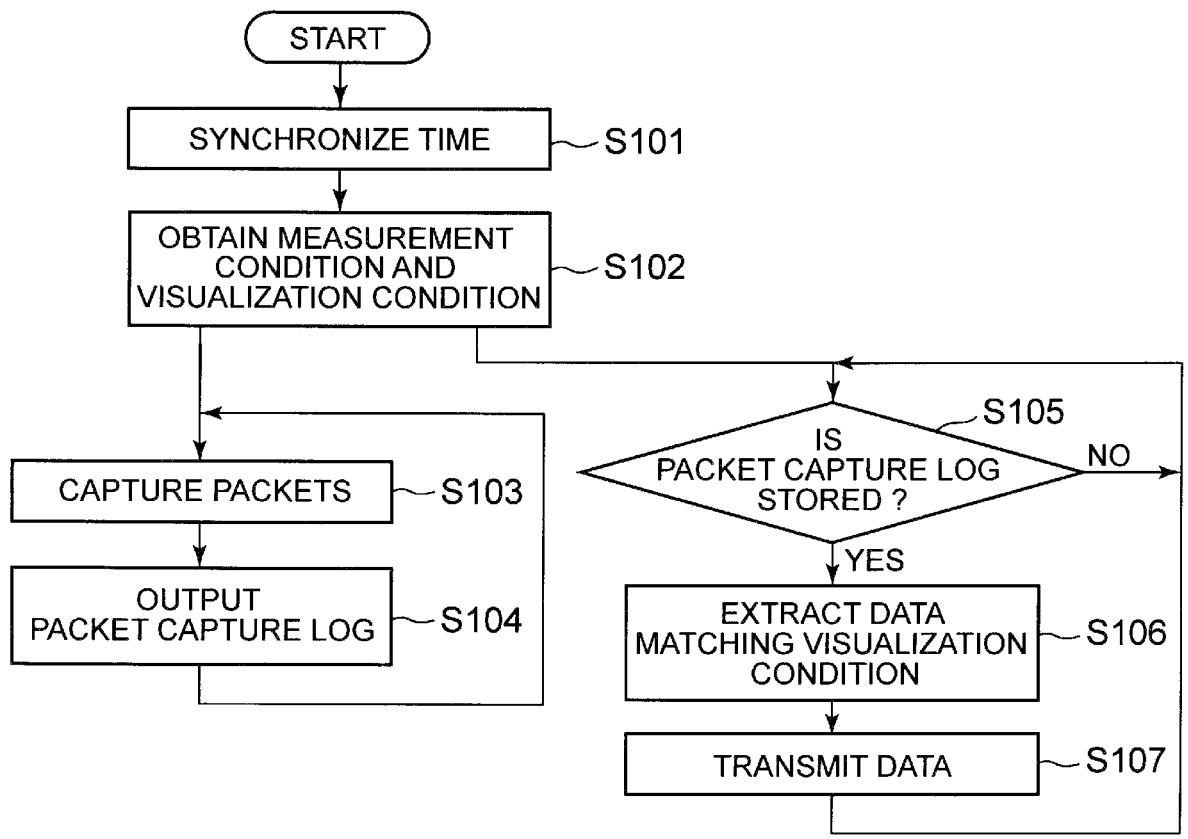
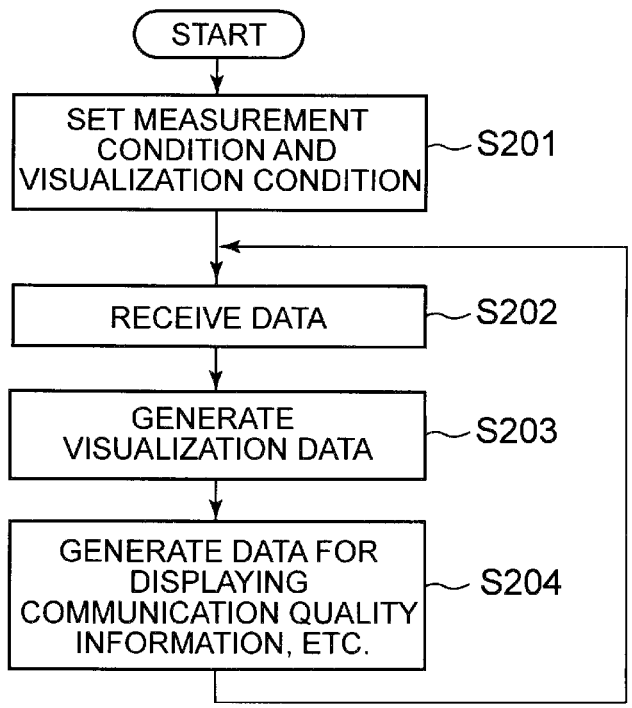

WIRELESS COMMUNICATION QUALITY VISUALIZATION SYSTEM, WIRELESS COMMUNICATION QUALITY VISUALIZATION DEVICE, AND MEASUREMENT APPARATUS

This application is a National Stage Entry of PCT/JP2020/001245 filed on Jan. 16, 2020, which claims priority from Japanese Patent Application 2019-007786 filed on Jan. 21, 2019, the contents of all of which are incorporated herein by reference, in their entirety.

TECHNICAL FIELD

The present invention relates to a wireless communication quality visualization system, a wireless communication quality visualization device, and a measurement device that visually display communication quality of a wireless communication environment.

BACKGROUND ART

As a system for evaluating communication quality of a wireless LAN (Local Area Network) that includes multiple access points (AP: Access Point), there is a system in which multiple measurement devices (capture devices) are used for example, refer to patent literature 1). The capture devices are installed at each of multiple points in a wireless LAN environment. The data captured by each capture device is analyzed by a communication quality information generation device.

In a system described in patent literature 1, the communication quality information generation device performs analysis using the data of the capture device that has successfully received the data sent from a terminal. Thus, the communication quality of a wide range in the wireless LAN environment can be evaluated. The number of total transmitted frames, the number of transmissions retries, an average transmission rate, and the maximum transmission rate are used as the communication quality.

The system described in patent literature 1 also has a display unit. The display unit displays a result of the evaluation of communication quality by the communication quality information generation device.

CITATION LIST

Patent Literature

Patent literature 1: Japanese Patent Laid-Open No. 2017-169003
Patent literature 2: Re-publication No. 2017-534192

SUMMARY OF INVENTION

Technical Problem

However, in the system described in patent literature 1, the communication quality information generation device only evaluates the communication quality and displays the result of the evaluation of the communication quality. The display unit does not display a time series of the communication quality. Furthermore, the system described in patent literature 1 does not take into account changing the evaluation target.

In addition, in the system described in patent literature 1, each capture device transmits all the captured data to the communication quality information generation device. Therefore, the processing load of the communication quality information generation device increases.

The patent literature 2 describes a system that displays time-series data regarding a radio spectrum. However, the system described in patent literature 2 only displays information on radio spectrum usage.

It is an object of the present invention to provide a wireless communication quality visualization system, a wireless communication quality visualization device, and a measurement device that can suppress an increase in the load related to the processing of collected data when displaying a time series of the communication quality of a wireless communication environment.

Solution to Problem

A wireless communication quality visualization system according to the present invention is a system which visually displays communication quality in a wireless communication environment where multiple measurement devices are installed includes a wireless communication quality visualization device, and includes a wireless communication quality visualization device that includes condition setting means for setting measurement condition that can identify a target whose communication quality is measured, and extraction condition that can identify data to be displayed in data on communication quality collected according to the measurement condition, and display data generation means for generating display data for displaying spatial and temporal communication quality from data received from the multiple measurement devices, wherein each of the multiple measurement devices includes data collection means for collecting data on communication quality according to the measurement condition, data extraction means for extracting data that matches the extraction condition from the data collected by the data collection means, and extracted data transmission means for transmitting the data based on the data extracted by the data extraction means to the wireless communication quality visualization device.

A wireless communication quality visualization device according to the present invention is an device which visually displays communication quality in a wireless communication environment where multiple measurement devices are installed, and includes condition setting means for setting measurement condition that can identify a target whose communication quality is measured, and extraction condition that can identify data to be displayed in data on communication quality collected according to the measurement condition, and display data generation means for generating display data for displaying spatial and temporal communication quality based on the data extracted according to the extraction condition.

A measurement device according to the present invention is a device which is communicatively connected to a wireless communication quality visualization device which visually displays communication quality in a wireless communication environment, and includes condition obtaining means for obtaining measurement condition that can identify a target whose communication quality is measured, and extraction condition that can identify data to be displayed in data on communication quality collected according to the measurement condition, data collection means for capturing packets in the wireless communication environment according to the measurement condition as data on communication quality, data extraction means for extracting data that matches the extraction condition from the data collected by the data collection means, and extracted data transmission means for transmitting the data based on the data extracted by the data extraction means to the wireless communication quality visualization device.

A wireless communication quality visualization method according to the present invention is a method which visually displays communication quality in a wireless communication environment where multiple measurement devices are installed, and includes setting measurement condition that can identify a target whose communication quality is measured, and extraction condition that can identify data to be displayed in data on communication quality collected according to the measurement condition, and generating display data for displaying spatial and temporal communication quality based on the data extracted according to the extraction condition.

The wireless communication quality visualization program according to the present invention, causes a computer to execute a process of setting measurement condition that can identify a target whose communication quality is measured, and extraction condition that can identify data to be displayed in data on communication quality collected according to the measurement condition, and a process of generating display data for displaying spatial and temporal communication quality based on the data extracted according to the extraction condition.

Advantageous Effects of Invention

According to the present invention, it is possible to suppress an increase in the load related to the processing of collected data when displaying a time series of the communication quality of a wireless communication environment.

BRIEF DESCRIPTION OF DRAWINGS

FIG. 4 It depicts a flowchart showing an operation of a measurement device.
FIG. 5 It depicts a flowchart showing an operation of a cloud server in the wireless communication quality visualization system of a first example embodiment.

DESCRIPTION OF EMBODIMENTS

Hereinafter, example embodiments of the present invention will be described with reference to the drawings.

Example Embodiment 1

Figure 1:
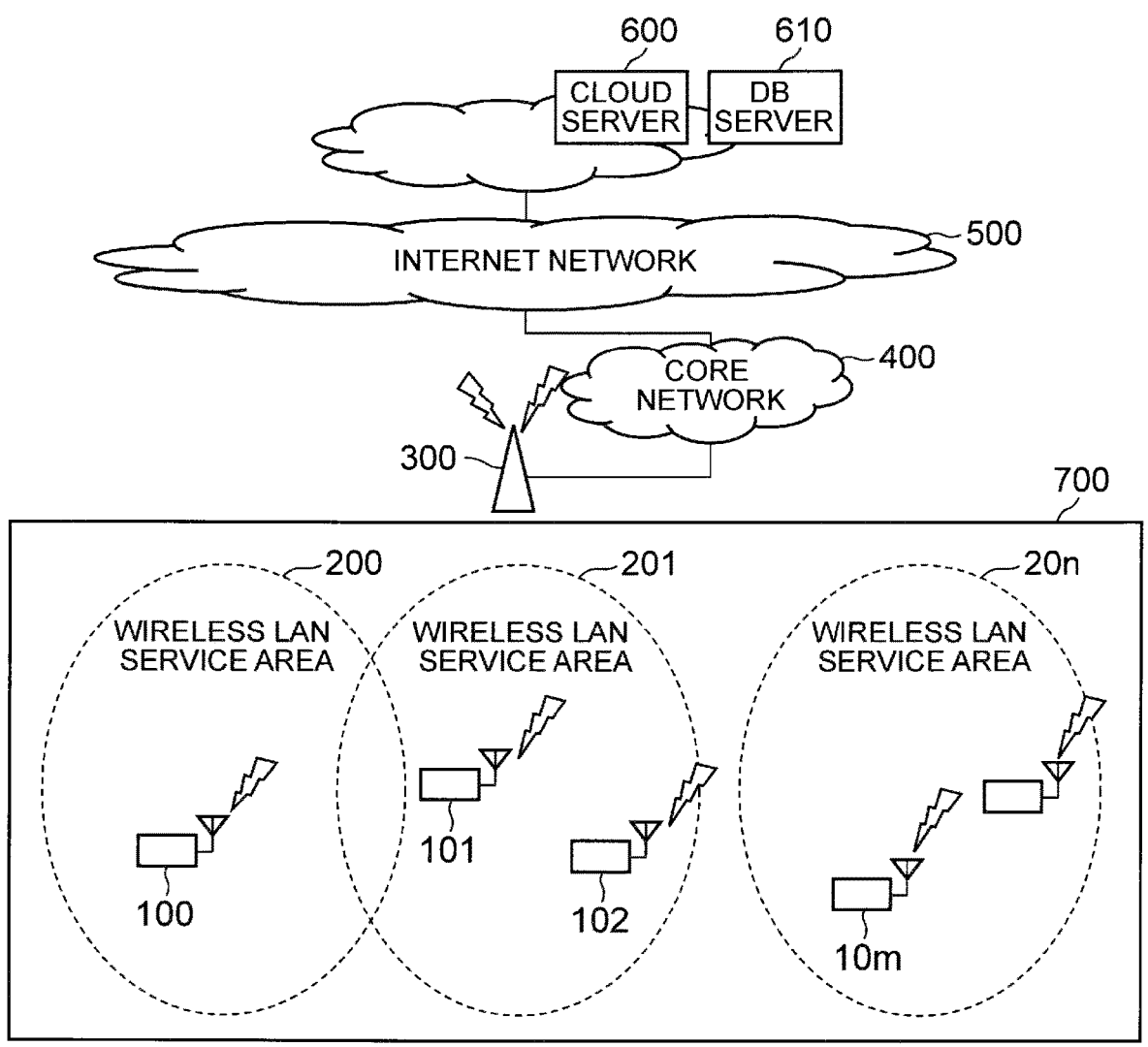
FIG. 1 It depicts a block diagram showing an example of an example embodiment of a wireless communication quality visualization system.

FIG. 1 is a block diagram showing a first example embodiment of a wireless communication quality visualization system. The wireless communication quality visualization system shown in FIG. 1 includes multiple wireless LAN service areas 200-20*n*. In this specification, for example, the wireless coverage by one or more APs (not shown in FIG. 1) with a certain SSID (Service Set Identifier) is defined as one wireless LAN service area. Wireless LAN service areas 200-20*n* are, as an example, set up in a factory or a construction site. In each of the wireless LAN service areas 200-20*n*, there are one or more terminals (not shown in FIG. 1). A terminal is, for example, a device or a sensor.

The wireless communication environment 700 consists of multiple wireless LAN service areas 200-20*n*. Multiple measurement devices 100-10*m* are installed in the wireless communication environment 700.

For example, each of the wireless LAN service areas 200-20*n* communicates with a cloud server 600 and a database server (DB server) 610 through a base station 300 of an LTE (Long Term Evolution: a registered trademark), a core network (carrier network by LTE network) 400 and an Internet network 500. The DB server 610 is also a kind of a cloud server. The line realized by the LTE base station 300 and the core network 400 is hereinafter referred to as the LTE line.

Figure 2:
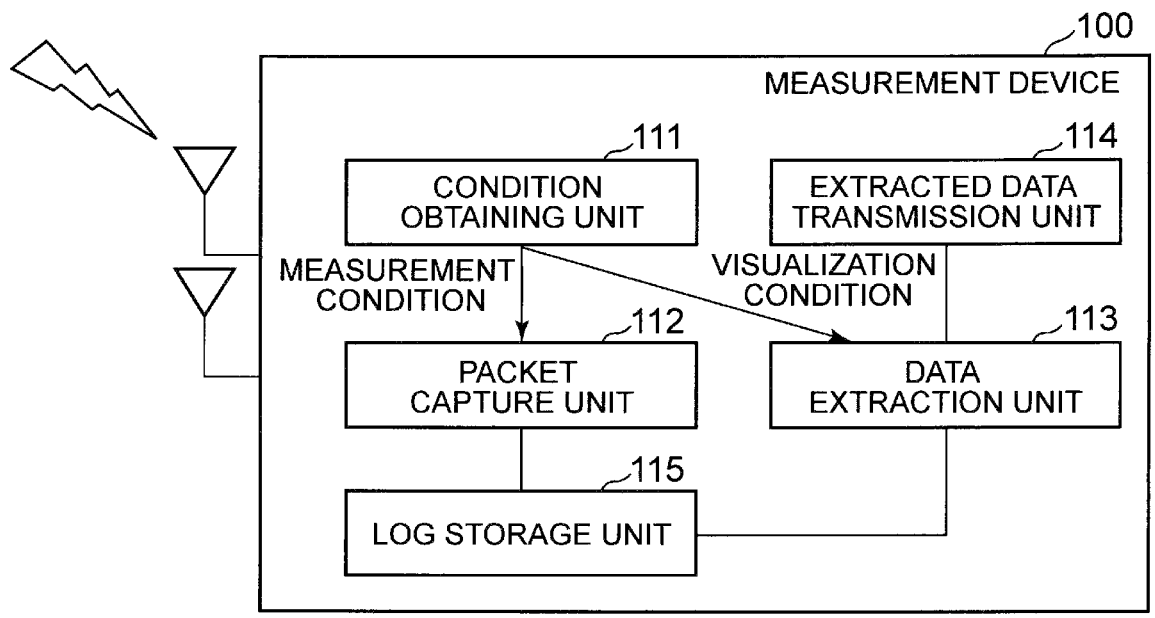
FIG. 2 It depicts a block diagram showing a configuration example of a measurement device.

FIG. 2 is a block diagram showing a configuration example of the measurement device 100. The measurement devices 101-10*m* are also configured in the same way as the measurement device 100.

In the example shown in FIG. 2, the measurement device 100 includes a condition obtaining unit 111, a packet capture unit 112, a data extraction unit 113, and an extracted data transmission unit 114, and a log storage unit 115.

The condition obtaining unit 111 obtains a measurement condition of communication quality (wireless communication quality) and a visualization condition (extraction condition) from the cloud server 600 through the Internet network 500 and the LTE line.

The measurement condition is a condition that can specify the target of communication quality measurement. Specifically, the measurement condition is a data obtaining condition that indicates when and what kind of data should be obtained. The measurement condition includes, for example, a frequency channel to be measured, a measurement period, a measurement cycle, a BSSID (Basic Service Set Identifier) of a recipient (destination) of the target of capture, and a BSSID of the source of the target of capture. The actual measurement condition to be set includes one or more of those items. The items included in the measurement condition are not limited to those, and other items may be included.

The number of frequency channels to be measured is not limited to one. When multiple frequency channels are to be measured, a measurement device with multiple wireless LAN functions is used. In the case of wireless LAN service area measurements that use channel bonding where multiple frequency communication channels are grouped together for a single communication, a measurement device capable of measuring channel bonding is used. A measurement device with a single wireless LAN function may observe multiple frequency channels to be measured in time division.

The visualization condition is a condition that can specify data to be visualized (displayed) among data collected according to the measurement condition. The visualization condition includes, for example, a BSSID of the AP or STA (station: terminal) to be visualized, location information of the AP (corresponding to information that specifies the area to be measured), location information of the measurement devices 100-10$m$ (corresponding to information that specifies the area to be measured), a communication indicator (RSSI (Received Signal Strength Indicator)), the number of connected STAs, a bandwidth occupancy rate, the number of transmission packets, the number of re-transmission packets, a re-transmission rate, throughput, etc.), aggregation time of a communication indicator, a direction of communication to be visualized (e.g., AP to STA, STA to AP), a capture performance indicator (e.g., the number of packets lost in capture, etc.), and a combination of source and destination which are visualization targets. The actual visualization condition to be set includes one or more of those items. The items included in the visualization condition are not limited to those, and other items may also be included.

The packet capture unit 112 captures packets according to the measurement condition and stores them in the log storage unit 115. The data extraction unit 113 extracts the data (captured packets) from the data stored in the log storage unit 115 that matches the visualization condition. The extracted data transmission unit 114 transmits the extracted data to the DB server 610.

Figure 3:
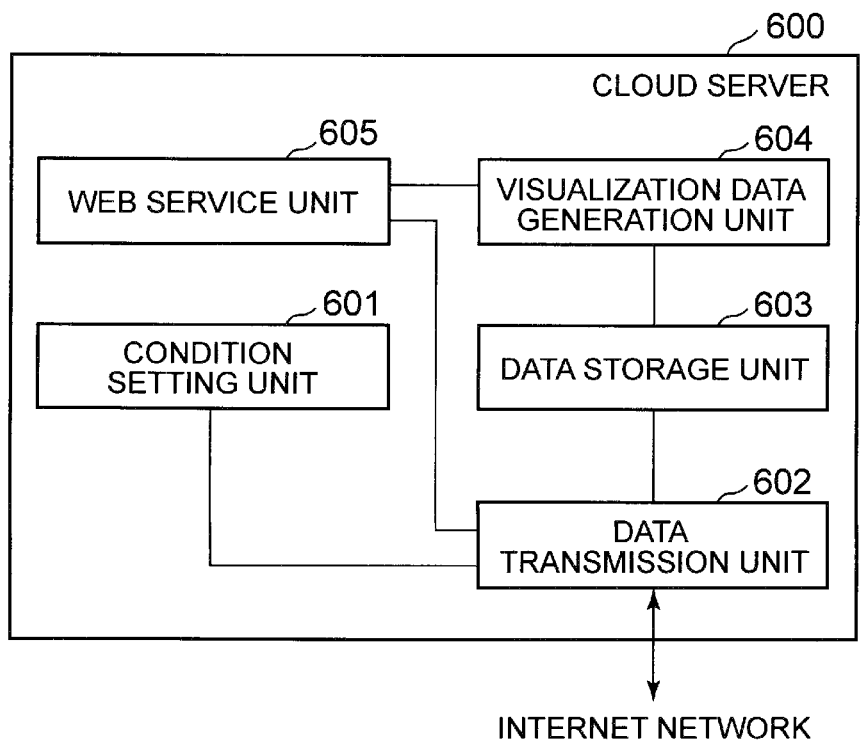
FIG. 3 It depicts a block diagram showing a configuration example of a cloud server.

FIG. 3 is a block diagram showing a configuration example of the cloud server 600.

In the example shown in FIG. 3, the cloud server 600 includes a condition setting unit 601, a data transmission unit 602, a data storage unit 603, a visualization data generation unit 604, and a web service unit 605.

The condition setting unit 601 sets the measurement condition and visualization condition to be used by the measurement device 100 in the measurement.

The data transmission unit 602 transmits the measurement condition and the visualization condition to the measurement devices 100-10$m$. In addition, the data transmission unit 602 receives the data related to visualization from the measurement devices 100-10$m$ stored by the DB server 610, and stores the data in the data storage unit 603. The visualization data generation unit 604 generates visualization data (data for display) using the data related to the visualization. The web service unit 605 uses the visualization data generated by the visualization data generation unit 604 to make the wireless quality information browsable data (hereinafter referred to as a web page).

In the present example embodiment, although the DB server 610 receives data from the measurement devices 100-10$m$ and stores the received data, and the cloud server 600 obtains data from the DB server 610, the division of roles between the cloud server 600 and the DB server 610 is not limited to such division. For example, the cloud server 600 may receive data from the measurement devices 100-10$m$ and store the received data in the DB server 610. The cloud server 600 may be configured to receive data from the measurement devices 100-10$m$ without preparing the DB server 610. In the present example embodiment, the wireless communication quality visualization device is realized by the cloud server 600 and the DB server 610, but if the cloud server 600 is configured to receive data from the measurement devices 100-10$m$, the wireless communication quality visualization device is realized by the cloud server 600.

The web page held by the web service unit 605 is supplied to the browsing terminal (not shown in FIG. 1), for example, in response to a request from the browsing terminal. The browsing terminal displays the web page downloaded from the web service unit 605 on a display unit.

Next, the operation of the wireless communication quality visualization system described. First, the operation of the measurement device 100 will be described with reference to the flowchart in FIG. 4. The measurement devices 101-10$m$ also operate in the same way as the measurement device 100.

The measurement device 100 synchronizes the time with the cloud server 600 through the Internet network 500 and LTE line (step S101). Specifically, the measurement device 100 makes an inquiry to the cloud server 600 for time synchronization. The cloud server 600 transmits data indicating the time to the measurement device 100 in response to the inquiry. The measurement device 100 sets the time to its own clock function based on the received data. The measurement device 100 may use other methods for time synchronization. For example, the measurement device 100 may use an NTP (Network Time Protocol) server to synchronize the time. In addition, each of the measurement devices 100-10$m$ may set the local time individually.

The measurement device 100 may perform the time synchronization process on a regular basis.

The condition obtaining unit 111 requests a measurement condition and a visualization condition from the cloud server 600 through the Internet network 500 and the LTE line. The cloud server 600 transmits a measurement condition and a visualization condition to the measurement device 100 in response to the request. In the measurement device 100, the condition obtaining unit 111 receives the measurement condition and the visualization condition (step S102). The condition obtaining unit 111 outputs the measurement condition to the packet capture unit 112. In addition, the condition obtaining unit 111 outputs the visualization condition to the data extraction unit 113.

Thereafter, the measurement device 100 repeatedly executes the processes of steps S103 and S104 and the processes of steps S105 through S107 in parallel.

In step S103, the packet capture unit 112 captures packets transmitted and received between the AP and the STA according to the measurement condition obtained in the process of step S102.

In the process of step S103, if the measurement condition includes a frequency channel, the packet capture unit 112 captures packets in that frequency channel. If the measurement condition includes a measurement period, the packet capture unit 112 captures packets transmitted during the measurement period. If the measurement condition includes a measurement cycle, the packet capture unit 112 captures packets every time the cycle elapses. If the measurement condition includes the BSSID of the destination, the packet capture unit 112 captures packets whose header contain the BSSID. If the measurement condition includes the BSSID of the source, the packet capture unit 112 captures packets whose header contain that BSSID.

In addition, the packet capture unit 112 measures an RSSI and a transmission rate, and assigns the RSSI and the transmission rate to the captured packets.

Then, the packet capture unit 112 outputs the captured packets to the log storage unit 115 (step S104). The log storage unit 115 stores the captured packets as a log.

In step S105, the data extraction unit 113 checks whether a log is stored in the log storage unit 115 or not. The stored log is data that has been collected according to the measurement condition. When the log is not stored in the log storage unit 115, the data extraction unit 113 executes the process of step S105 again after a predetermined time.

When the log is stored in the log storage unit 115, the data extraction unit 113 extracts the data that matches the visualization condition from the log storage unit 115 (step S106).

In the process of step S106, the data extraction unit 113 extracts the data as follows. However, the following method is an example, and other methods may be used. The following example is for the case where the communication indicator is included in the visualization condition.

When the communication indicator to be visualized is RSSI, the data extraction unit 113 uses the RSSI data given to the log of the captured packets.

When the communication indicator to be visualized is the number of connected STAs, the data extraction unit 113 counts, at regular intervals, the type of BSSID of the destination of packets whose source BSSID is the BSSID of the AP to be measured.

When the communication indicator to be visualized is a bandwidth occupancy rate, the data extraction unit 113 aggregates packet lengths at regular intervals based on a packet size of the captured packets and transmission rate information.

When the communication indicator to be visualized is the number of transmitted packets, the data extraction unit 113 counts the number of packets transmitted by the AP or STA to be visualized.

When the communication indicator to be visualized is the number of retransmitted packets or a re-transmission rate, the data extraction unit 113 uses a result of aggregating the re-transmission flags contained in the header part of packets at regular intervals.

When the communication indicator to be visualized is a throughput, the data extraction unit 113 aggregates packet sizes at regular intervals.

The data extraction unit 113 assigns time information to the counted or aggregated data.

The data extraction unit 113 may delete the data (captured packets) to be aggregated from the log storage unit 115 after the aggregation process, but the log storage unit 115 may store the data for a predetermined period after the aggregation process. If the data is stored, when a problem in communication is discovered, the stored data can be used to analyze the problem.

The extracted data transmission unit 114 transmits the data (extracted data) generated by the data extraction unit 113 to the DB server 610 through the Internet network 500 and LTE line (step S107). The DB server 610 stores the received data. The DB server 610 provides the data to the cloud server 600 through the Internet network 500 in response to a request from the cloud server 600.

Next, the operation of the cloud server 600 will be explained with reference to the flowchart in FIG. 5.

In the cloud server 600, the condition setting unit 601 sets the measurement condition and the visualization condition (step S201). The condition setting unit 601 uses, for example, the measurement condition and the visualization condition input by an operator in advance through an input unit (not shown in FIG. 3).

After that, the cloud server 600 repeatedly executes the processes of steps S202 to S204.

In step S202, the data transmission unit 602 receives data related to visualization from the DB server 610. The data transmission unit 602 stores the received data in the data storage unit 603. The data related to visualization is data generated based on the data extracted from the log storage unit 115 by the data extraction unit 113 in the measurement devices 100-10m. In other words, the data concerning visualization is the extracted data described above.

The visualization data generation unit 604 generates visualization data using the data stored in the data storage unit 603 (step S203). The visualization data is data for display generated based on the data (stored in the data storage unit 603) that indicates communication quality and operating status of the wireless communication environment. As an example, the visualization data is data for displaying a radio wave propagation map, and data for displaying a time series of communication indicators in a graph, for example. The radio wave propagation map may be displayed as a heat map.

With respect to RSSI, only the data at the installation points of the measurement devices 100-10m exists. Therefore, the visualization data generation unit 604 generates the data of RSSI in the space of the wireless communication environment 700 by an interpolation process using the data at the installation points of the measurement devices 100-10m.

In addition, the visualization data generation unit 604 uses the most reliable information among the information extracted using the packets captured by the packet capture unit 112 in each of the measurement devices 100-10m. The visualization data generation unit 604 determines the reliability based on, for example, RSSI strength aggregated for each source and destination pair and the number of packets that could be captured.

The visualization data generation unit 604 uses highly reliable information aggregated by each of the measurement devices 100-10m as a bandwidth occupancy rate of AP.

Based on the visualization data, the web service unit 605 generates a web page in which the communication quality and other information are displayed as a radio wave propagation map and a time series of communication indicators (step S204). The radio wave propagation map is an example of the spatial communication quality, and the time series of communication indicators is an example of the temporal communication quality. The spatial communication quality means communication quality that varies in space. The temporal communication quality means communication quality that changes over time. After that, the process proceeds to step S202.

The above process allows the cloud server 600 to construct an environment that can display a time series of communication quality.

Figure 6:
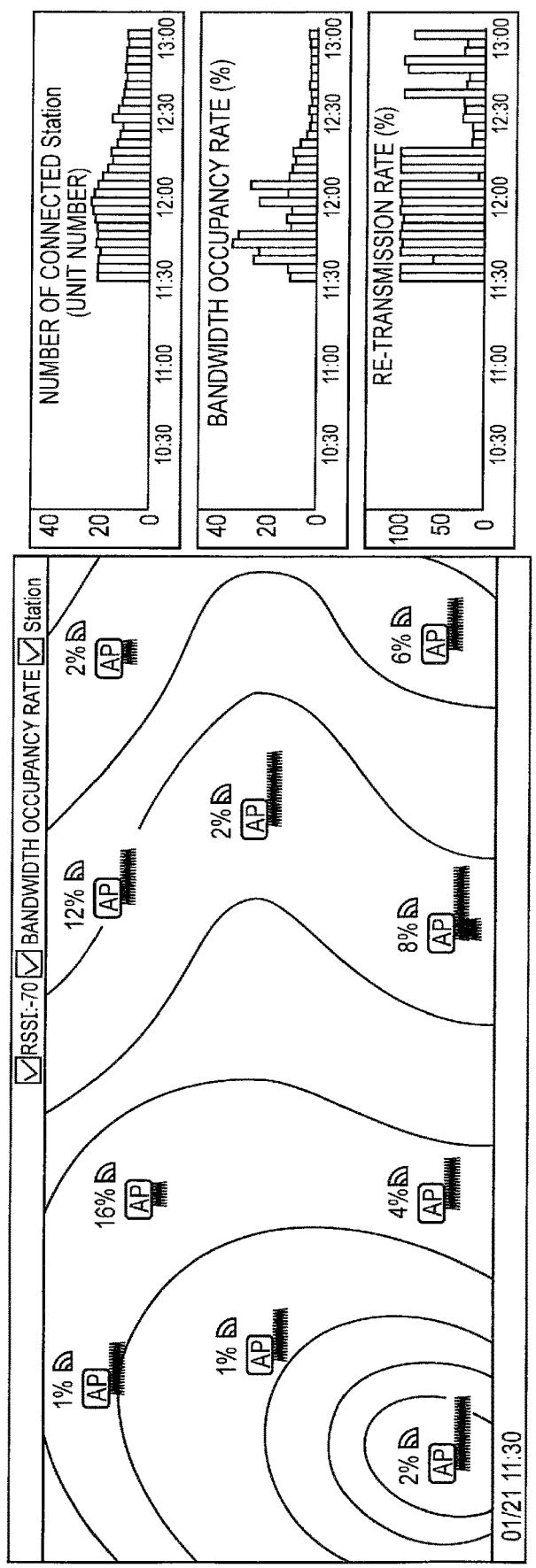
FIG. 6 It depicts an explanatory diagram showing an example of a display in a browsing terminal.

FIG. 6 is an explanatory diagram showing an example of a display in a browsing terminal.

In the example shown in FIG. 6, the radio propagation map in the space of the wireless communication environment 700 is displayed time series. Although FIG. 6 shows the radio propagation map at a specific time, the display can be updated automatically or in response to instruction of an operator. Although only APs are shown in FIG. 6, it is preferable that STAs are also displayed. When STAs are displayed, the display position may be updated when a given icon is clicked, taking into account the possibility that the STA may move. When the cloud server 600 is configured to be able to recognize the location of the STA at any time, the display position of the STA may be updated each time the movement of the STA is recognized.

In the example shown in FIG. 6, the time series of the number of STAs connected to the AP, the bandwidth occupancy rate of AP, and the re-transmission rate are displayed as graphs. For example, in the left diagram in FIG. 6, when an AP is selected (e.g., clicked), the number of STAs, the bandwidth occupancy rate of AP, and the re-transmission rate for that AP may be displayed.

In the example shown in FIG. 6, a pin indicating the number of connected STAs is displayed below the icon indicating the AP, but the display color may be changed according to the communication quality level of the STAs.

As explained above, in the wireless communication quality visualization system of the present example embodiment, the measurement devices 100-10$m$ selectively capture packets based on the measurement condition and selectively extract the captured packets based on the visualization condition, thus reducing the processing load on the measurement devices 100-10$m$. This results in a relative increase in processing speed.

In addition, the wireless communication quality visualization device can display the data of multiple communication indicators in a time series. As a result, communication problems can be analyzed efficiently. In addition, since the data transmitted from the measurement device 100-10$m$ to the wireless communication quality visualization device (in the present example embodiment, the cloud server 600) is selected based on the visualization condition, the increase in the data is suppressed. As a result, the processing load of the wireless communication quality visualization device is reduced as compared to the case where all the collected data is transmitted to the wireless communication quality visualization device. As a result, the processing speed is relatively improved, and the responsivity of the visualization process (display process) is improved.

In addition, since the cloud server 600 sets the measurement condition and the visualization condition, the measurement condition and the visualization condition can be set without an administrator or others having to visit the measurement device 100-10$m$ installed at the site, such as a factory or a construction site. Therefore, the wireless communication quality visualization system of the present example embodiment can be effectively used to visualize communication quality, etc. at factories, construction sites, etc., where access to the site is highly difficult, for example.

Example Embodiment 2

Figure 7:
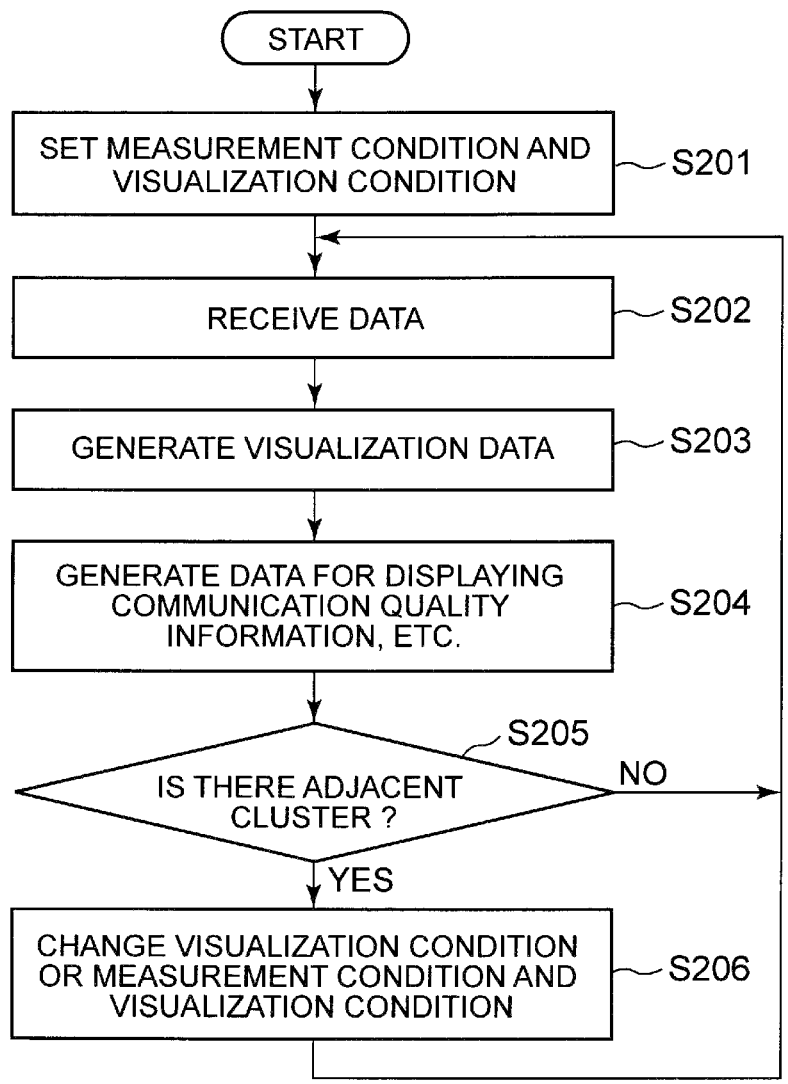
FIG. 7 It depicts a flowchart showing an operation of a cloud server in the wireless communication quality visualization system of a second example embodiment.

FIG. 7 is a flowchart showing the operation of the cloud server 600 in the wireless communication quality visualization system of the second example embodiment. In the second example embodiment, the measurement devices 100-10$m$ and the cloud server 600 are also configured as shown in FIGS. 2 and 3. In addition, the wireless communication environment 700 shown in FIG. 1 is assumed.

The cloud server 600 executes the processes of steps S201 to S204 as in the case of the first example embodiment, and then executes the processes of steps S205 and S206.

That is, the condition setting unit 601 in the cloud server 600 determines whether a change condition of the visualization condition has been satisfied or not (step S205). If the change condition has been satisfied, the condition setting unit 601 changes the visualization condition or the measurement condition and the visualization condition (step S206). The data transmission unit 602 transmits the changed visualization condition or the measurement condition and visualization condition to the measurement devices 100-10$m$.

The following is an example of the satisfaction of a change condition.

Suppose that the BSSID of an STA newly connected to an AP that matches the measurement condition and the visualization condition is included in the extracted data. In that case, the condition setting unit 601 adds the BSSID of the new STA to the visualization condition.

With such processing, the RSSI of the new STA can be displayed thereafter.

It is also assumed that the condition setting unit 601 sets the measurement condition to capture beacons transmitted by APs, and that the measurement devices 100-10$m$ transmit the BSSID included in the beacon. If a BSSID of a source that is not included in a filter condition is detected, the condition setting unit 601 changes the measurement condition and the visualization condition so that the communication indicator of the AP identified by the BSSID is transmitted from the measurement devices 100-10$m$. Thereafter, communication indicator, etc. of APs with BSSIDs that are not included in the filter condition can be displayed.

Such a process enables the cloud server 600 to monitor communication status of APs with BSSIDs that is not included in the filter condition.

In each of the above example embodiments, a cloud server 600 is used as the wireless communication quality visualization device, but an on-premises server may be used as the wireless communication quality visualization device. When an on-premises server is used, the on-premises server communicates with the measurement devices 100-10$m$ through a private communication network, for example.

In the above example embodiments, the wireless communication environment consisting of wireless LAN service areas 200-20$n$ was used as an example, but the wireless communication environment constructed with LTE, the wireless communication environment constructed with LPWA (Low Power Wide Area), the wireless communication environment constructed with Bluetooth (registered trademark), the wireless communication environment constructed with ZigBee (registered trademark), etc. can also be used to visually display the communication quality and operating status.

In the above example embodiments, an LTE line is assumed as the communication channel between the measurement devices 100-10$m$ and the wireless communication quality visualization device such as the cloud server 600. However, the communication channel may be a wired LAN, a channel other than the measurement target to be measured in a wireless LAN, a communication channel by LPWA, a communication channel by Bluetooth, or a communication channel by ZigBee.

Figure 8:
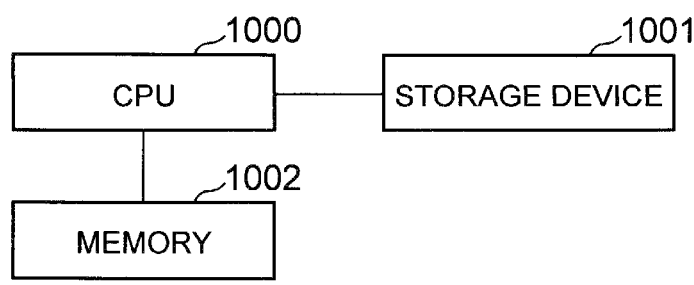
FIG. 8 It depicts a block diagram showing an example of a computer with a CPU.

FIG. 8 is a block diagram showing an example of a computer having a CPU (Central Processing Unit). The computer is implemented in a wireless communication quality visualization device or a measurement device. The CPU 1000 executes processing in accordance with a program stored in the storage device 1001 to realize the functions in the above example embodiments. In other words, the computer realizes functions other than the log storage unit 115 and the wireless communication function in the measurement device 100 shown in FIG. 2. The computer also realizes functions other than the wireless communication function in the cloud server 600 shown in FIG. 3.

The storage device 1001 is, for example, a non-transitory computer readable medium. The non-transitory computer readable medium includes various types of tangible storage media. Specific examples of the non-transitory computer readable medium include magnetic storage media (for example, hard disk), and semiconductor memories (for example, mask ROM, PROM (programmable ROM), EPROM (erasable PROM), flash ROM).

The program may also be stored on various types of transitory computer readable media. The temporary computer readable medium is supplied with the program, for example, through wired or wireless communication channels.

The memory 1002 is realized, for example, by RAM (Random Access Memory), and is a storage means for temporarily storing data when the CPU 1000 executes processing. It can be assumed that a program held by the storage device 1001 or a temporary computer readable medium is transferred to the memory 1002, and that the CPU 1000 executes processing based on the program in the memory 1002. The log storage unit 115 shown in FIG. 2 and the data storage unit 603 shown in FIG. 3 are realized by the memory 1002 or the storage device 1001.

Figure 9:
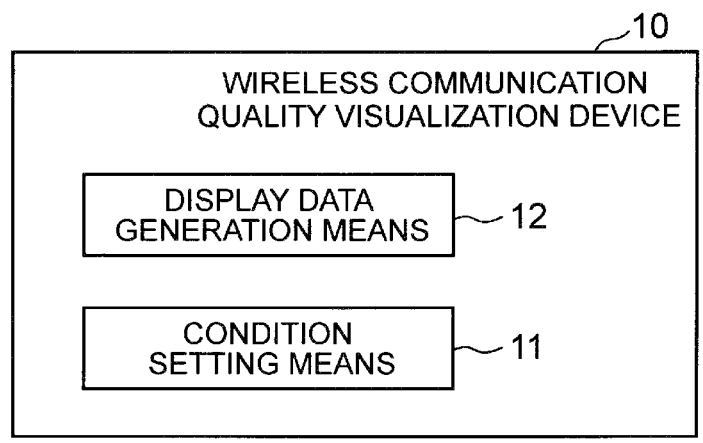
FIG. 9 It depicts a block diagram showing the main part of the wireless communication quality visualization device.

FIG. 9 is a block diagram showing the main part of the wireless communication quality visualization device. The wireless communication quality visualization device 10 (in the example embodiments, realized by the cloud server 600) shown in FIG. 9 comprises condition setting means 11 (in the example embodiments, realized by the condition setting unit 601, as an example) for setting measurement condition that can identify a target whose communication quality is measured, and extraction condition that can identify data to be displayed in data on communication quality collected according to the measurement condition, and display data generation means 12 (in the example embodiments, realized by the visualization data generation unit 604 and the web service unit 605, as an example) for generating display data for displaying spatial and temporal communication quality based on the data extracted according to the extraction condition.

Figure 10:
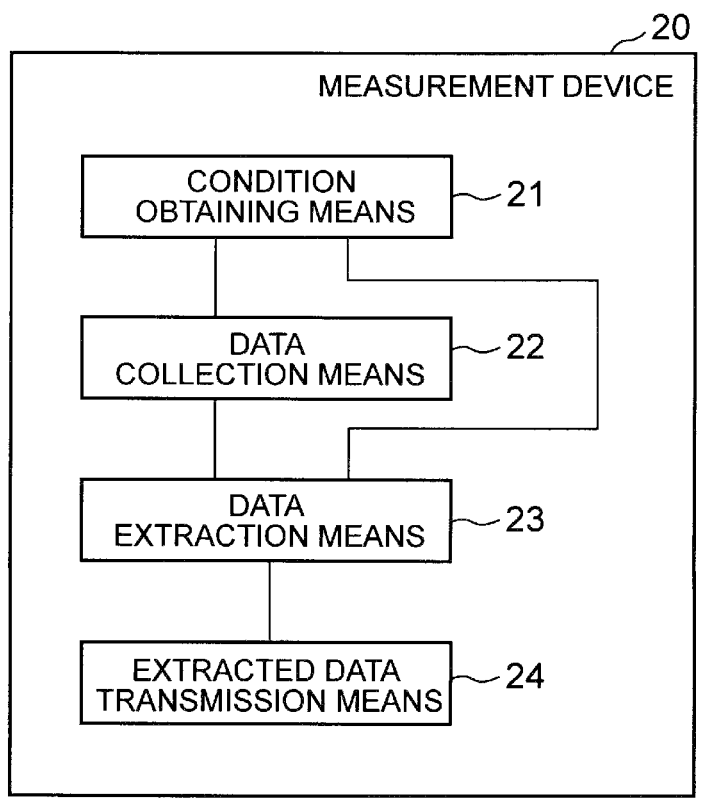
FIG. 10 It depicts a block diagram showing the main part of the measurement device.

FIG. 10 is a block diagram showing the main part of the measurement device. The measurement device 20 shown in FIG. 10 comprises condition obtaining means 21 (in the example embodiments, realized by a condition obtaining unit 111, as an example) for obtaining measurement condition that can identify a target whose communication quality is measured, and extraction condition that can identify data to be displayed in data on communication quality collected according to the measurement condition, data collection means 22 (in the example embodiments, realized by a packet capture unit 112, as an example) for capturing packets in the wireless communication environment according to the measurement condition as data on communication quality, data extraction means 23 (in the example embodiments, the data extraction unit 113, as an example) for extracting data that matches the extraction condition from the data collected by the data collection means, and extracted data transmission means 24 (in the example embodiments, the extracted data transmission unit 114, as an example) for transmitting the data based on the data extracted by the data extraction means to the wireless communication quality visualization device.

Figure 11:
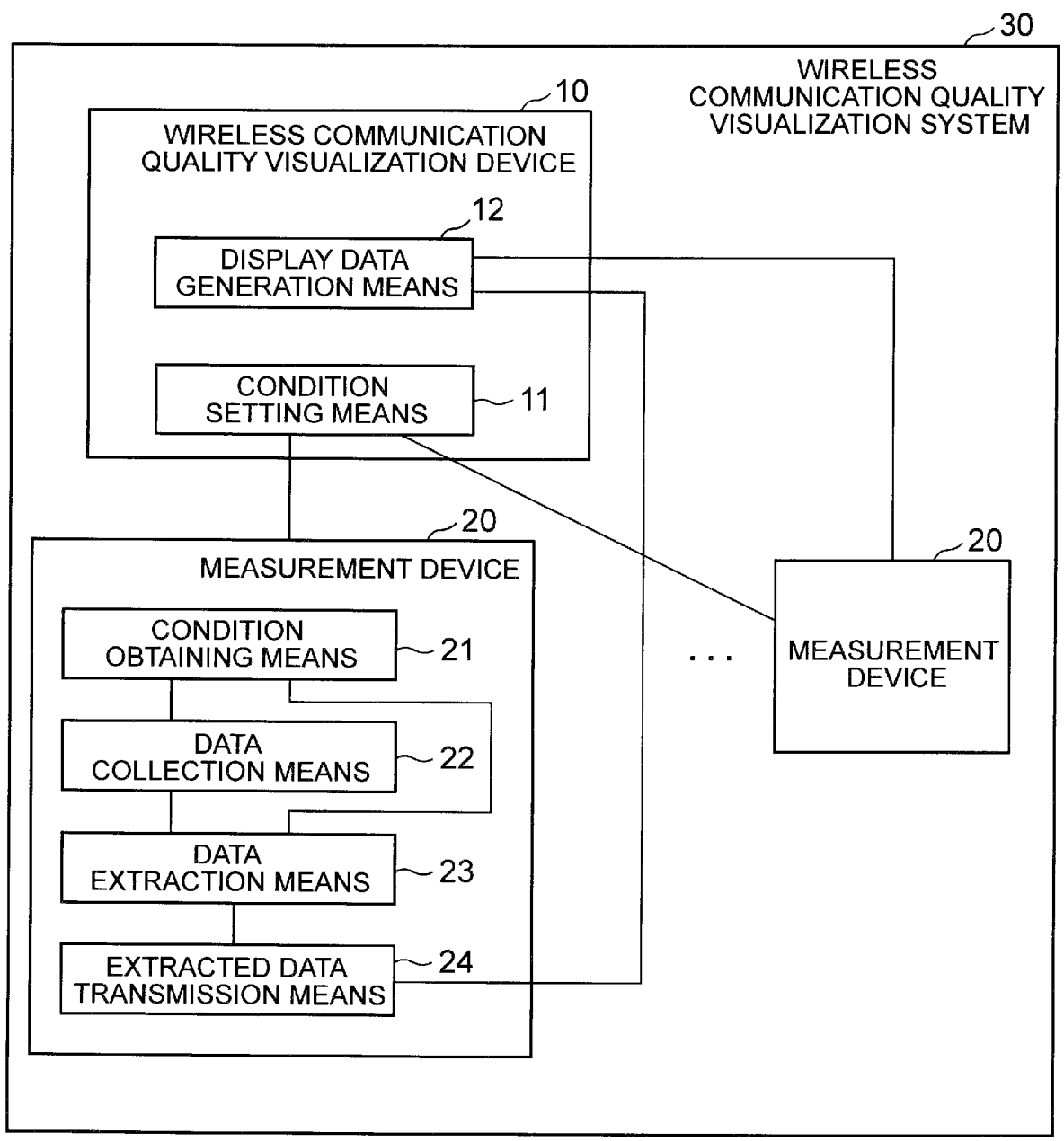
FIG. 11 It depicts a block diagram showing the main part of the wireless communication quality visualization system.

FIG. 11 is a block diagram showing the main part of the wireless communication quality visualization system. The wireless communication quality visualization system 30 shown in FIG. 11 comprises condition setting means 11 (in the example embodiments, realized by a condition setting unit 601, as an example) for setting measurement condition that can identify a target whose communication quality is measured, and extraction condition that can identify data to be displayed in data on communication quality collected according to the measurement condition, and display data generation means 12 (in the example embodiments, realized by a visualization data generation unit 604 and a web service unit 605, as an example) for generating display data for displaying spatial and temporal communication quality from data received from the multiple measurement devices, wherein each of the multiple measurement devices 20 includes data collection means 22 (in the example embodiments, realized by the packet capture unit 112, as an example) for collecting data on communication quality according to the measurement condition, data extraction means 23 (in the example embodiments, the data extraction unit 113, as an example) for extracting data that matches the extraction condition from the data collected by the data collection means, and extracted data transmission means 24 (in the example embodiments, the extracted data transmission unit 114, as an example) for transmitting the data based on the data extracted by the data extraction means to the wireless communication quality visualization device.

While the present invention has been described with reference to the example embodiments, the present invention is not limited to the aforementioned example embodiments. Various changes understandable to those skilled in the art within the scope of the present invention can be made to the structures and details of the present invention.

This application claims priority based on Japanese Patent Application No. 2019-007786 filed on Jan. 21, 2019, the disclosures of which are incorporated herein in their entirety.

REFERENCE SIGNS LIST

10 Wireless communication quality visualization device
11 Condition setting means
12 Display data generation means
20 Measurement device
21 Condition obtaining means
22 Data collection means
23 Data extraction means
24 Extracted data transmission means
30 Wireless communication quality visualization system
100-10m Measurement device
111 Condition obtaining unit
112 Packet capture unit
113 Data extraction unit
114 Extracted data transmission unit
115 Log storage unit
200-20n Wireless LAN service area
300 LTE base station
400 Core network
500 Internet network
600 Cloud server
601 Condition setting unit
602 Data transmission unit
603 Data storage unit
604 Visualization data generation unit
605 Web service unit
610 Database server (DB server)
700 Wireless communication environment
1000 CPU
1001 Storage device
1002 Memory

What is claimed is:

1. A wireless communication quality visualization system which visually displays communication quality in a wireless communication environment in which multiple measurement devices are installed, comprising:
a wireless communication quality visualization device that includes a first processor and a first memory storing fist instructions executable by the first processor to:
set a measurement condition that can identify a target whose communication quality is measured, and an extraction condition that can identify second data to be displayed among first data on the communication quality collected according to the measurement condition; and generate display data for displaying the communication quality that varies in space and that changes over time, from the second data as received from each of the multiple measurement devices, wherein each of the multiple measurement devices includes a second processor and a second memory storing second instructions executable by the second processor to:

collect the first data on the communication quality according to the measurement condition;

extract the second data that matches the extraction condition from the first data; and transmit the second data to the wireless communication quality visualization device, and wherein each of the multiple measurement devices synchronizes time with the wireless communication quality visualization device.

2. The wireless communication quality visualization system according to claim 1, wherein the wireless communication quality visualization device changes at least the extraction condition based on the first data on the communication quality collected according to the measurement condition.

3. The wireless communication quality visualization system according to claim 1, wherein each of the multiple measurement devices captures packets in the wireless communication environment.

4. The wireless communication quality visualization system according to claim 1, wherein the wireless communication environment includes multiple access points in a wireless LAN.

5. A wireless communication quality visualization device which visually displays communication quality in a wireless communication environment in which multiple measurement devices are installed, and which synchronizes time with the multiple measurement devices, comprising:

a processor; and a memory storing instructions executable by the processor to:

set a measurement condition that can identify a target whose communication quality is measured, and an extraction condition that can identify second data to be displayed among first data on the communication quality collected according to the measurement condition; and generate display data for displaying the communication quality that varies in space and that changes over time, based on the second data extracted by each of the multiple measurement devices according to the extraction condition from the first data collected according to the measurement condition.

6. The wireless communication quality visualization device according to claim 5, wherein the processor changes at least the extraction condition based on the first data on the communication quality collected according to the measurement condition.

7. The wireless communication quality visualization device according to claim 5, wherein the wireless communication quality visualization device is a cloud server.

8. A measurement device which is communicatively connected to a wireless communication quality visualization device which visually displays communication quality in a wireless communication environment, comprising:

a processor; and a memory storing instructions executable by the processor to:

obtain a measurement condition that can identify a target whose communication quality is measured, and an extraction condition that can identify second data to be displayed among first data on the communication quality collected according to the measurement condition;

capture packets in the wireless communication environment according to the measurement condition as the first data on the communication quality;

extract the second data that matches the extraction condition from the first data; and transmit the second data to the wireless communication quality visualization device, wherein the measurement device synchronizes time with the wireless communication quality visualization device.

* * * * *